(12) United States Patent
Suzuki et al.

(10) Patent No.: US 9,115,973 B2
(45) Date of Patent: Aug. 25, 2015

(54) PROFILE MEASURING INSTRUMENT

(71) Applicant: MITUTOYO CORPORATION, Kanagawa (JP)

(72) Inventors: Yoshimasa Suzuki, Ibaraki (JP); Akinori Saito, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 121 days.

(21) Appl. No.: 13/903,472

(22) Filed: May 28, 2013

(65) Prior Publication Data
US 2013/0321821 A1    Dec. 5, 2013

(30) Foreign Application Priority Data

May 31, 2012  (JP) ................................ 2012-125064

(51) Int. Cl.
*G01B 11/02*  (2006.01)
*G01B 9/02*   (2006.01)

(52) U.S. Cl.
CPC ........ *G01B 9/02056* (2013.01); *G01B 9/02091* (2013.01)

(58) Field of Classification Search
CPC .. G01B 9/02; G01B 11/2441; G01B 11/0675; G01B 11/303; G01N 21/9501
USPC ....................................................... 356/511
See application file for complete search history.

(56) References Cited

U.S. PATENT DOCUMENTS

| 7,681,439 B2 | 3/2010 | Kawasaki et al. |
| 2007/0057196 A1* | 3/2007 | Matsushima ............ 250/442.11 |
| 2008/0047335 A1 | 2/2008 | Kawasaki et al. |
| 2009/0027685 A1* | 1/2009 | Abe et al. ...................... 356/477 |

FOREIGN PATENT DOCUMENTS

JP    2008-051602    3/2008

* cited by examiner

*Primary Examiner* — Tarifur Chowdhury
*Assistant Examiner* — Md Rahman
(74) *Attorney, Agent, or Firm* — Greenblum & Bernstein, P.L.C.

(57) ABSTRACT

A profile measuring instrument includes: a fixed member of which position relative to a workpiece having a surface to be profile-measured is fixed; a scanning member supported by the fixed member and movable in a scan direction along the surface of the workpiece relative to the fixed member; a laser interferometer that detects a displacement of the surface of the workpiece along the scan direction. The laser interferometer includes: a polarizing beamsplitter provided to the scanning member; a reference mirror fixed to the fixed member; a measurement optical path extending from the polarizing beamsplitter to the workpiece; and a reference optical path extending from the polarizing beamsplitter to the reference mirror. A difference between an optical path length of the measurement optical path and an optical path length of the reference optical path is a predetermined tolerable error or less.

5 Claims, 3 Drawing Sheets

PROFILE MEASURING INSTRUMENT

The entire disclosure of Japanese Patent Application No. 2012-125064 filed May 31, 2012 is expressly incorporated by reference herein.

BACKGROUND OF THE INVENTION

1. Field of the Invention

The present invention relates to a profile measuring instrument. More specifically, the invention relates to an instrument for measuring a surface profile of an object with a high accuracy.

2. Description of Related Art

A typical instrument for highly accurately measuring a surface profile of an object (workpiece) includes variety of instruments depending on the degree of irregularities of the workpiece surface to be measured. For instance, a surface roughness measuring instrument has been used for quantitatively measuring a roughness of a workpiece surface, whereas a scanning probe microscope has been used for observing an atomic-level irregularities of a workpiece.

These highly accurate profile measuring instruments scan a surface of a workpiece in a predetermined scan direction with a probe and detect a profile of the workpiece surface as a function of the position in the scan direction and a displacement of the probe on the workpiece surface.

During the scanning, the workpiece surface is optically scanned or a minute stylus (probe) supported by a cantilever is used for tracing the workpiece surface while optically detecting a displacement (corresponding to a displacement of a stylus tip tracing the workpiece surface) of a predetermined portion located on a backside (i.e. a side opposite to a side facing the stylus and the workpiece) of the cantilever.

Various improvements have been made in the profile measuring instruments in response to a demand for enhancing the accuracy thereof (see Literature 1: JP-A-2008-51602). In the Literature 1, the inventors of the present application have noted a motion error during the above-described scanning of the workpiece surface and proposed a profile measuring instrument having a unique structure for eliminating the influence of the motion error.

Specifically, the above-described scanning profile measuring instrument requires a scanning mechanism for moving a displacement sensor in order to scan the workpiece surface, where the motion error in the scanning mechanism is inevitable. Such a motion error is detected by the displacement sensor as an additional component to the displacement of the stylus in accordance with irregularities on the workpiece surface. In other words, the displacement detected by the displacement sensor is influenced by the motion error as compared to the true displacement of the stylus in accordance with the irregularities on the workpiece surface.

In contrast, when the displacement sensor is a device that detects a displacement of a measurement target portion relative to a reference member (e.g. a laser interferometer), the influence of the motion error in the data detected by the displacement sensor can be canceled by holding the reference member relative to the workpiece in a manner that the position and attitude of the reference member stay constant.

In the invention disclosed in the Literature 1, the reference member is supported so that the position and attitude of the reference member stay constant relative to the workpiece as discussed above, thereby eliminating the motion error of the scanning mechanism.

Specifically, a reference mirror (reference member) is supported along a workpiece surface, a stylus is supported via a cantilever between the reference mirror and the workpiece, and a laser interferometer is disposed opposite to the workpiece relative to the reference mirror. The laser beam from the laser interferometer is reflected by the reference mirror to provide the reference beam. A part of the laser beam is transmitted through the reference mirror to be reflected by a predetermined portion on a backside of the cantilever to provide measurement beam. The stylus and the laser interferometer are moved along the workpiece surface and the reference mirror for scanning by a scanning mechanism. The laser interferometer compares the measurement beam and the reference beam to measure the displacement of the stylus on the workpiece surface.

According to the above arrangement, even when a motion error is caused in the scanning mechanism while the workpiece surface is scanned, the influence acts on both of the measurement beam and the reference beam. Thus, the influence is cancelled when comparing the measurement beam and the reference beam and does not appear on a profile measurement data of the workpiece surface obtained by the laser interferometer.

It should be noted that the displacement sensor exemplified in the Literature 1 is an optical interferotype displacement meter, which is specifically a Fizeau laser interferometer that uses a laser beam and the reference mirror is disposed in an optical path of the measurement beam.

However, since the backside of the stylus (measurement target portion) is disposed in an extension of the optical path of the reference beam (i.e. reference optical path, from a light source to the reference mirror) and the optical path of the measurement beam (i.e. measurement optical path, from the light source to the measurement target portion) is partially shared by the reference optical path in the Fizeau laser interferometer, the length of the measurement optical path inevitably becomes longer than the reference optical path by the distance between the reference mirror and the measurement target portion. The optical path length difference between the measurement optical path and the reference optical path is referred to as a dead path.

Under the presence of the dead path, stability of a light source influences on a measurement error.

In other words, even without irregularities on the object to be measured, the fluctuation in the frequency of the laser creates an apparent difference in the optical path length, which appears as a measurement error.

Specifically, during length measurement with a laser interferometer, the apparent optical path length varies depending on the frequency stability of a laser (light source) and the length of the above-described dead path.

For instance, when the frequency stability of the laser is $1 \times 10^{-6}$ and supposing that the length of the dead path is 100 mm, an apparent variation of the optical path length is calculated as: $1 \times 10^{-6} \times 100 \times 10^{-3}$ m=$100 \times 10^{-9}$ m=100 nm.

The apparent variation of the optical path length depending on the frequency stability of the laser beam is a cause of an error of 100 nm due to the frequency fluctuation of the laser beam even without irregularities on the object to be measured.

In order to reduce the measurement error due to the frequency stability of the laser beam, the length of the dead path may be reduced or a frequency-stabilized laser having high frequency stability may be used.

However, the above solutions respectively accompany the following problems.

With regard to the reduction in the length of the dead path, optical elements (e.g. a lens and wave plate) for concentrating the laser beam onto the backside of the cantilever have to be disposed between the reference mirror and the backside of the stylus in the Fizeau laser interferometer. Since a space for receiving the optical elements and holders thereof is required, it is difficult to reduce the length of the dead path (i.e. the distance between the reference mirror and the backside of the stylus) to an order of, for instance, several millimeters.

With regard to the frequency stability of the laser beam, a laser source of which frequency stability is in an order of $1\times10^{-9}$ is currently commercially available, which can be used for stabilizing the laser beam frequency. However, all of these frequency-stable laser sources are as expensive as approximately JPY one million.

On the other hand, since the frequency stability of an inexpensive semiconductor laser source is approximately $1\times10^{-3}$ and the frequency stability of a He—Ne laser of which frequency is not stabilized is approximately $1\times10^{-6}$, in order to reduce the influence on the measurement error, the length of the dead path has to be significantly reduced. Thus, a Fizeau laser interferometer which requires the above-described space for disposing the optical elements cannot be constructed.

As described above, the arrangement disclosed in the Literature 1 accompanies the problem of the presence of the dead path, where stability of a light source influences on a measurement error. In addition, the device exemplified in the Literature 1 accompanies the following problem for supporting the reference mirror.

Specifically, in the invention disclosed in the Literature 1, in order to hold the reference mirror (reference member) so that the position and attitude of the reference mirror stay constant relative to a workpiece, the workpiece is mounted on a base and the reference mirror is supported on the base via a plurality of columns (holder member), whereby the workpiece is covered with the reference mirror.

According to the above structure, a measurable area on a workpiece surface is limited to an area surrounded by the plurality of columns supporting the reference mirror.

SUMMARY OF THE INVENTION

An object of the invention is to provide a profile measuring instrument that is capable of eliminating a motion error during a scanning process and an error due to a presence of a dead path and that is less restricted in terms of measurable area.

A profile measuring instrument according to an aspect of the invention includes: a fixed member of which position is fixed relative to a workpiece having a surface of which profile to be measured; a scanning member supported by the fixed member, the scanning member being movable in a scan direction along the surface of the workpiece relative to the fixed member; and an interferometer provided to the fixed member, the interferometer detecting a displacement of the surface of the workpiece along the scan direction, in which the interferometer includes: a light source; a polarizing beamsplitter provided to the scanning member, the polarizing beamsplitter dividing a beam from the light source into a reference beam and a measurement beam; a reference mirror fixed to the fixed member; a measurement optical path in a form of an optical path of the measurement beam, the measurement optical path extending from the polarizing beamsplitter to the workpiece; and a reference optical path in a form of an optical path of the reference beam, the reference optical path extending from the polarizing beamsplitter to the reference mirror, and in which a difference between an optical path length of the measurement optical path and an optical path length of the reference optical path is a predetermined tolerable error or less.

In the above aspect of the invention, the predetermined tolerable error is preferably a value equal to a measurement accuracy required for a measurement instrument divided by frequency stability of the light source to be used.

For instance, in order to attain a measurement accuracy of 1 nm or less, when the frequency stability of the used light source is $10^{-6}$, the above described predetermined tolerable error becomes 1 nm/$10^{-6}$=$10^6$ nm=1 mm. Thus, a desired measurement accuracy can be ensured when the above-described difference between the optical path length of the measurement optical path and the optical path length of the reference optical path is 1 mm or less.

In the above aspect of the invention, as an alternative arrangement for the interferometer, a light source that supplies light beam to be the reference beam and the measurement beam to the polarizing beamsplitter and a detecting device that re-combines the reference beam and the measurement beam for causing interference are preferably used. For instance, a device using laser beams (light source) and a polarizing beamsplitter that separates the reference optical path and the measurement optical path can be constructed by a so-called Michelson interferometer or Twyman-Green interferometer.

According to the above arrangement, the light beam from the laser source and the like is divided into the reference beam and the measurement beam by the polarizing beamsplitter. The reference beam passes through the reference optical path and reflected by the reference mirror to be returned to a detector. The measurement beam passes through the measurement optical path and reflected by the surface of the workpiece, or the predetermined portion of the stylus in contact with the surface of the workpiece or the cantilever to be returned to the detector. The detector detects the displacement on the surface of the workpiece based on an interference state of the reference beam and the measurement beam. Accordingly, the surface of the workpiece can be scanned by moving the scanning member in the scan direction, thereby measuring the profile of the surface of the workpiece in the scan direction.

In the above aspect of the invention, the reference mirror is fixed to the fixed member and the relative position of the reference mirror and the workpiece is fixed. Accordingly, even when a motion error is caused in accordance with the movement of the scanning member, the motion error is equally present in the workpiece and the reference mirror. Thus, the influence of the motion error on the interference between the reference beam and the measurement beam is cancelled, whereby the influence of the motion error in accordance with the scanning process can be eliminated.

Further, in the above aspect of the invention, since the optical path length of the measurement optical path (from the polarizing beamsplitter to the surface of the workpiece, or the predetermined portion of the stylus to be in contact with the surface of the workpiece or the cantilever) is set equal to the optical path length of the reference optical path (from the polarizing beamsplitter to the reference mirror), in other words, since the difference between the optical path length of the measurement optical path and the optical path length of the reference optical length is the predetermined tolerable error or less, the dead path (i.e. difference in the optical path lengths of the optical paths) is substantially not created. Thus, the influence of an error due to the presence of the dead path can be eliminated.

In addition, since the measurement optical path and the reference optical path are separately provided and the reference mirror can be disposed at a position remote from the workpiece in the above aspect of the invention, the measurable area for the workpiece is not limited.

In the above aspect of the invention, the reference mirror preferably has a reflection surface facing the reference optical path, the reflection surface being arranged in parallel to the scan direction.

It should be noted that it is preferable to add and arrange optical element(s) as necessary to the reference optical path for changing a direction of an optical axis from the beam splitter so that the light is perpendicularly incident on the reference mirror and the reflected light returns through the same optical path.

According to the above arrangement, even when the beam splitter and the reference optical path move together with the scanning member during the scanning process, since a change rate of the optical path length of the measurement optical path becomes equal to a change rate of the optical path length of the reference optical path, an interference optical path with a constant dead path can be provided.

In the above aspect of the invention, the profile measuring instrument preferably includes: a cantilever having a fixed end supported by the scanning member; and a stylus provided at a free end of the cantilever, the stylus having a tip that is adapted to be in contact with the surface of the workpiece, in which the measurement beam from the polarizing beamsplitter is preferably reflected by a predetermined portion on the cantilever on a side opposite to the stylus.

According to the above arrangement, with the use of the cantilever and the stylus, it is not necessary to directly reflect the measurement beam on the surface of the workpiece, so that reliable measurement beam can be obtained without being influenced by reflection properties of the surface of the workpiece and the like.

In the above aspect of the invention, the interferometer preferably is a laser interferometer that uses a gas laser source or a semiconductor laser source as the light source.

According to the above arrangement, since the dead path is eliminated, even when the light source is provided by a gas laser source or a semiconductor laser source providing laser beam with relatively low stability, a highly accurate measurement is possible and the production cost of the profile measuring instrument can be reduced.

In the above aspect of the invention, the interferometer preferably uses a low-coherence light source that emits a beam of which coherence is lower than a laser beam.

According to the above arrangement, since the dead path is eliminated, a low-coherence light source (e.g. a high-intensity light-emitting diode) that cannot be employed in a Fizeau laser interferometer can be used as the light source for interference measurement, so that the production cost of the profile measuring instrument can be reduced.

DESCRIPTION OF EMBODIMENT(S)

Figure 1:
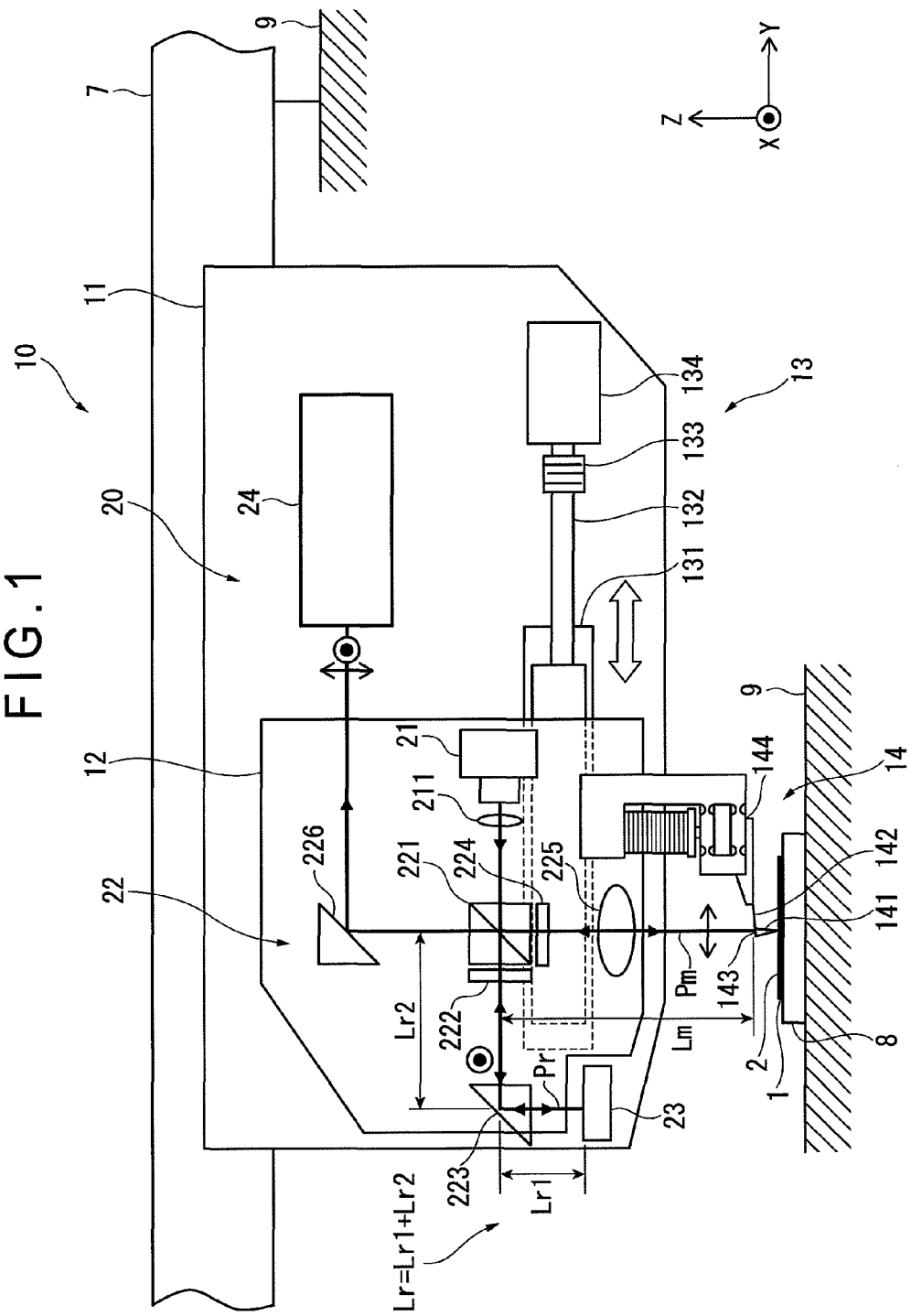
FIG. 1 schematically shows an arrangement according to an exemplary embodiment of the invention.

Exemplary embodiment(s) of the invention will be described below with reference to the attached drawings.

A profile measuring instrument 10 shown in FIG. 1 measures a profile of a surface 2 of a workpiece 1 using a laser interferometer 20 (described later in detail).

The workpiece 1 is mounted on a table 8 disposed on a base 9. The profile measuring instrument 10 is supported by a column 7 disposed on the base 9 at a position different from that of the table 8. A relative position between the workpiece 1 and the profile measuring instrument 10 is fixed via the base 9. In this exemplary embodiment, the surface 2 of the workpiece 1 is defined to be parallel to an X axis and Y axis. Z axis is defined to extend in a direction perpendicular to the surface 2.

As described later, the profile measuring instrument 10 according to this exemplary embodiment scans the surface 2 of the workpiece 1 in the Y-axis direction (scan direction) with the laser interferometer 20 to detect a displacement in the Z-axis direction according to scanned positions, thereby measuring the profile of the surface 2.

The profile measuring instrument 10 includes a fixed member 11, a scanning member 12, a scanning mechanism 13 and a contact mechanism 14.

The fixed member 11 is provided by a rigid base or a part of a rigid housing and is supported by the column 7. A part of the components of the laser interferometer 20 is disposed on a surface of the fixed member 11 extending along the Y and Z axes.

The scanning member 12 is supported on a surface of the fixed member 11 via the scanning mechanism 13. A main part of the components of the laser interferometer 20 is disposed on the scanning member 12. The scanning member 12 is adapted to be moved in the Y-axis direction (scan direction) by the scanning mechanism 13.

The scanning mechanism 13 includes a guide mechanism 131 with a highly accurate linearity in the Y-axis direction. The scanning member 12 is supported to the fixed member 11 via the guide mechanism 131 so as to be movable to a desired position in the Y-axis direction.

A motor 134 is connected to the guide mechanism 131 via the shaft 132 and the coupling 133.

The shaft 132 is connected with a movable part of the guide mechanism 131 via a highly accurate feed screw mechanism.

The coupling 133 is capable of transmitting a rotary force of the motor 134 to the shaft 132 while absorbing deformations (e.g. an axial eccentricity, an inclination, an expansion and a contraction) of the shaft 132.

The motor 134 is controlled by a controller (not shown) so as to rotate the shaft 132 by the rotary force thereof, whereby the scanning member 12 supported by the guide mechanism 131 is adapted to be driven in the Y-axis direction (scan direction).

The contact mechanism 14 includes a stylus 141 having a tip to be in contact with the surface 2 of the workpiece 1. The stylus 141 is fixed to an end (free end) of the cantilever 142. A base end (fixed end) of the cantilever 142 is supported by the scanning member 12 via an elastic hinge 144.

A predetermined portion 143 (i.e. a measurement target of which displacement is measured by the laser interferometer 20) is defined on a backside of the cantilever 142. The predetermined portion 143 is provided directly opposite to the stylus 141, so that a displacement of the predetermined portion 143 reflects the displacement of a tip of the stylus 141 on the workpiece 1 when the tip displaces in the Z-axis direction in accordance with the irregularities on the surface 2 under the presence of the elastic hinge 144.

Accordingly, the irregularities on the surface 2 of the workpiece 1 can be detected in a form of the displacement of the stylus 141 with the laser interferometer 20 when the scanning member 12 is moved in the scan direction by the scanning mechanism 13 while the stylus 141 keeps in contact with the surface 2 of the workpiece 1.

The laser interferometer 20 includes a laser source 21, optical path elements 22, a reference mirror 23 and a phase detector 24.

The laser source 21 supplies a laser beam for an interferometric measurement. The laser source 21 is provided by an inexpensive laser source with relatively low frequency stability such as an existing semiconductor laser or a gas laser (e.g. He—Ne laser). The laser beam generated by the laser source 21 is supplied to the optical path elements 22 through the lens 211.

The phase detector 24 is also provided by an existing device that measures an interfering light intensity of a combined light of the reference beam and the measurement beam through optical paths defined by the later-described optical path elements 22 and the reference mirror 23 to detect the irregularities on the object to be measured.

Among the components of the laser interferometer 20, the reference mirror 23 and the phase detector 24 are supported by the fixed member 11 and are located at fixed positions relative to the workpiece 1.

On the other hand, the laser source 21 and the optical path elements 22 are provided on the scanning member 12 and are moved by the scanning mechanism 13 for scanning the workpiece 1.

The optical path elements 22 include a polarizing beamsplitter 221, λ/4 wave plates 222 and 224, mirrors 223 and 226 and a lens 225.

The laser beam generated by the laser source 21 enters the polarizing beamsplitter 221.

The polarizing beamsplitter 221 transmits a part of the incoming laser beam and reflects the rest of the incoming laser beam to divide the incoming laser beam into two beams.

In this exemplary embodiment, the divided two laser beams are respectively used as the reference beam and the measurement beam that respectively pass through a reference optical path Pr and a measurement optical path Pm independent with each other, thereby constructing a so-called Michelson interferometer or Twyman-Green interferometer.

The laser beam from the laser source 21 transmitted through the polarizing beamsplitter 221 is a polarization in Y-Z plane, which passes through the λ/4 wave plate 222 and is reflected by the mirror 223 to reach the reference mirror 23. The laser beam reflected by the reference mirror 23 is reflected by the mirror 223 to return again to the polarizing beamsplitter 221 and is then reflected thereat because the laser beam having transmitted through the λ/4 wave plate 222 twice becomes a polarization in X-Y plane to be sent to the mirror 226.

The laser beam passing the above path is the reference beam and the optical path from the polarizing beamsplitter 221 through the mirror 223 to the reference mirror 23 is defined as the reference optical path Pr. An optical path length Lr of the reference optical path Pr is the sum of an optical path length Lr2 from the polarizing beamsplitter 221 to the mirror 223 and an optical path length Lr1 from the mirror 223 to the reference mirror 23 (Lr=Lr1+Lr2).

It should be noted that the reference mirror 23 is disposed on and is supported by the fixed member 11 so that a reflection surface (reference surface) of the reference mirror 23 becomes parallel to the surface 2 of the workpiece 1.

Thus, a distance (the optical path length Lr1) between the mirror 223 disposed on the scanning member 12 and the surface of the reference mirror 23 disposed on the fixed member 11 is kept constant irrespective of the movement of the scanning member 12 in the scan direction. The mirror 223 and the polarizing beamsplitter 221 are both disposed on the scanning member 12 and the distance between the mirror 223 and the polarizing beamsplitter 221 (the optical path length Lr2) is always kept constant.

As described above, the optical path length Lr (=Lr1+Lr2) of the reference optical path Pr stays constant irrespective of the movement of the scanning member 12 in the scan direction.

The laser beam from the laser source 21 reflected by the polarizing beamsplitter 221 is a polarization in X-Y plane, which passes through the λ/4 wave plate 224 and is condensed by the lens 225 to be irradiated on the above-described predetermined portion 143 of the cantilever 142. The laser beam reflected by the predetermined portion 143 returns again to the polarizing beamsplitter 221 and is reflected thereat because the laser beam having transmitted through the λ/4 wave plate twice becomes a polarization in the Y-Z plane to be sent to the mirror 226.

The laser beam passing the above path is the measurement beam and the optical path from the polarizing beamsplitter 221 to the predetermined portion 143 is defined as the measurement optical path Pm. The optical path length Lm of the measurement optical path Pm is defined as an optical path length from the polarizing beamsplitter 221 to the predetermined portion 143.

In this exemplary embodiment, the position of the reference mirror 23, the distance between the scanning member 12 and the surface 2 of the workpiece 1 and the like are adjusted so that the optical path length Lm of the measurement optical path Pm becomes substantially equal to the above-described optical path length Lr (Lr=Lr1+Lr2) of the reference optical path Pr.

Specifically, the optical path length Lm and the optical path length Lr are adjusted so that the difference between the optical path lengths Lm and Lr falls at or within a predetermined tolerable error (1 mm in this exemplary embodiment).

The predetermined tolerable error used herein is a value equal to a measurement accuracy required for a measurement instrument divided by frequency stability of the light source to be used. For instance, in order to attain a measurement accuracy of 1 nm or less, when the frequency stability of the used laser source 21 is $10^{-6}$, the above described predetermined tolerable error becomes 1 nm/$10^{-6}$=$10^6$ nm=1 mm. Thus, the desired measurement accuracy can be ensured when the difference between the optical path length Lm of the measurement optical path Pm and the optical path length Lr of the reference optical path Pr is 1 mm or less.

Accordingly, there is no substantial difference in the optical path lengths (i.e. the dead path) between the measurement optical path Pm and the reference optical path Pr.

It should be noted that the direction of the laser beam having entered to be reflected by the reference mirror 23 in the reference optical path Pr is the same as the entering and reflecting direction of the laser beam on the predetermined portion 143 in the measurement optical path Pm (i.e. downward in the figure, −Z direction).

As described above, the polarizing beamsplitter 221 divides the laser beam from the laser source 21 and, in addition, combines the measurement beam from the measurement optical path Pm and the reference beam from the reference optical path Pr. The measurement beam and the reference beam returned to the polarizing beamsplitter 221 are combined again to provide a combined light fed to the mirror 226 and having polarization planes orthogonal with each other.

The combined light enters the phase detector 24 via the mirror 226 and produces interference thereat. The phase detector 24 detects the interference intensity to detect the variation of the length of the measurement optical path Pm according to the scanned positions, so that the irregularities on the surface 2 of the workpiece 1 in accordance with the scanned positions can be measured.

In this exemplary embodiment, the irregularities on the surface 2 of the workpiece 1 in accordance with the scanned positions can be measured with the above arrangement.

According to the arrangement of this exemplary embodiment, motion error caused by the scanning mechanism 13 can be canceled and is kept from being influenced on the measurements.

For instance, it is supposed that the scanning member 12 is moved in the Y-axis direction (scan direction) by the scanning mechanism 13 (see FIG. 1) in order to scan the surface 2 of the workpiece 1.

Figure 2:
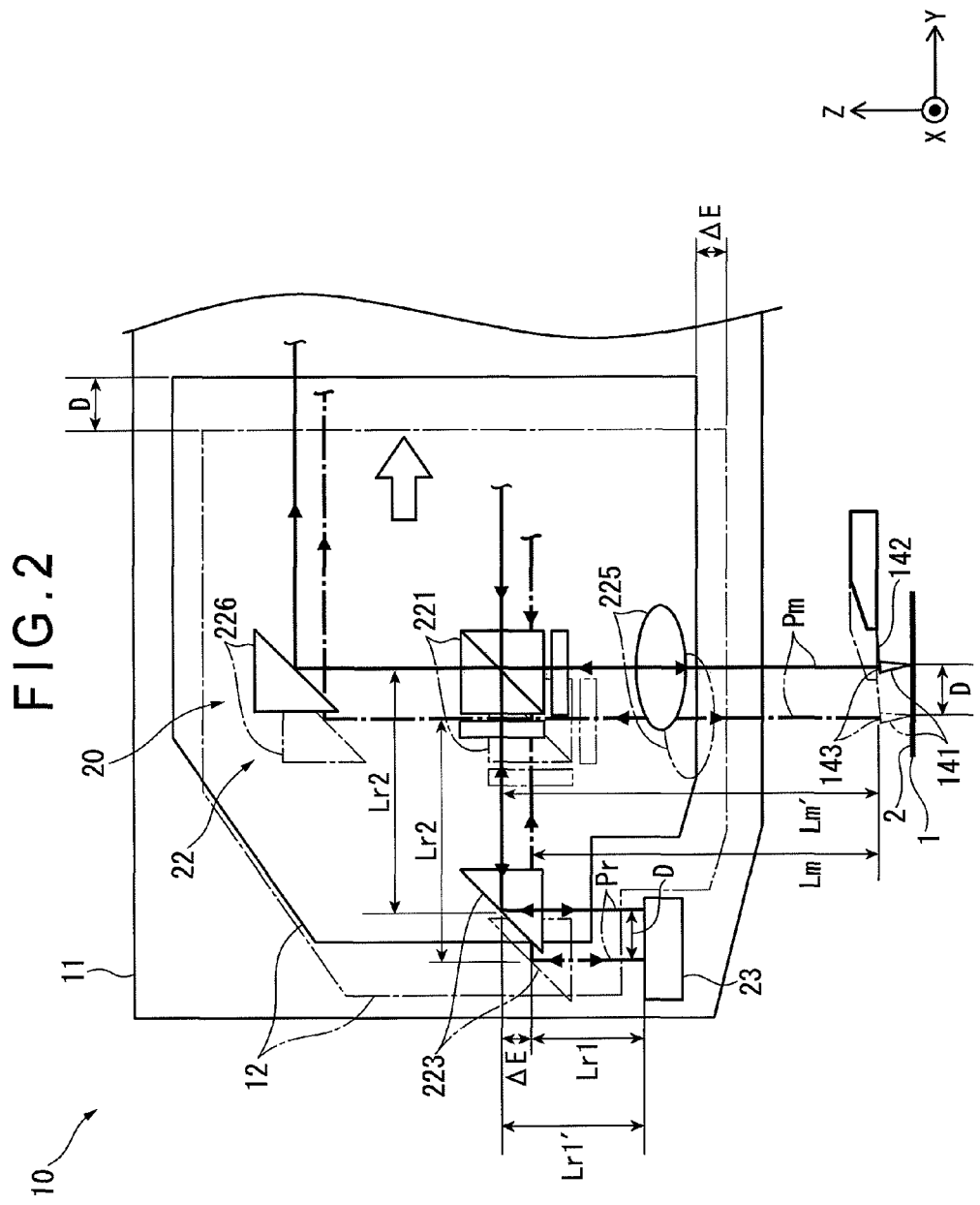
FIG. 2 schematically shows an operation according to the exemplary embodiment of the invention shown in FIG. 1.

FIG. 2 shows the scanning member 12 before the movement (shown in chain lines in FIG. 2) that is moved to the position of the scanning member 12 after the movement (shown in solid lines in FIG. 2).

The movement of the scanning member 12 by the distance D in the Y-axis direction relative to the fixed member 11 is the intended displacement for scanning. However, due to the motion error of the scanning mechanism 13 and the like, the scanning member 12 is inevitably displaced in the X-axis direction or the Z-axis direction relative to the fixed member 11.

In the above, the motion error $\Delta E$ in the Z-axis direction is in the same direction as the displacement of the predetermined portion 143 of the cantilever 142 detected by the laser interferometer 20 and exerts influence on the detection results in a form of the fluctuation of the optical path length of the measurement optical path Pm.

Specifically, when the optical path length without an error is a nominal optical path length Lm of the measurement optical path Pm and the optical path length is fluctuated by Ra (Lm"=Lm−Ra) in accordance with the irregularities on the surface 2 of the workpiece 1, the laser interferometer 20 compares the optical path length Lm" with the optical path length Lr (=Lr1+Lr2) of the reference optical path Pr to obtain a detection value Rd of the irregularities as Rd=Lr−Lm"=Lr−(Lm−Ra). Since Lr is set equal to Lm (Lr=Lm), the detection value Rd can be detected as Rd=Ra.

In contrast, as shown in FIG. 2, when the motion error $\Delta E$ for causing a displacement of the scanning member 12 in the Z-axis direction relative to the fixed member 11, the optical path length of the measurement optical path Pm becomes Lm'=Lm−Ra+$\Delta E$, so that the detection value Rd becomes Rd=Lr−Lm'=Lr−(Lm−Ra+$\Delta E$)=Ra+$\Delta E$, which is influenced by the motion error $\Delta E$ and does not show the accurate Rd=Ra.

However, according to this exemplary embodiment, since the reference mirror 23 is fixed on the fixed member 11, the above-described motion error $\Delta E$ between the scanning member 12 and the fixed member 11 is equally present in the optical path length Lr of the reference optical path Pr.

As shown in FIG. 2, the optical path length Lm of the measurement optical path Pm becomes equal to the optical path length Lm'=Lm−$\Delta E$ due to the movement of the scanning member 12 (movement in the X-axis direction by the distance D).

During the movement, though the optical path length Lr2 of the reference optical path Pr from the polarizing beamsplitter 221 to the mirror 223 does not change, the optical path length Lr1' from the mirror 223 to the reference mirror 23 is changed to Lr1'=Lr1+$\Delta E$ being influenced by the motion error $\Delta E$. Accordingly, the optical path length of the reference optical path Pr is changed from Lr=Lr1+Lr2 (before the movement) to Lr'=Lr1'+Lr2=Lr1+Lr2+$\Delta E$=Lr+$\Delta E$ (after the movement).

Thus, the detection value Rd detected by the laser interferometer 20 becomes Rd=Lr'−Lm'=(Lr+$\Delta E$)−(Lm−Ra+$\Delta E$)=Ra, so that the motion error $\Delta E$ can be canceled and the accurate detection value Rd=Ra can be obtained.

As described above, the Michelson laser interferometer 20 is constructed and the measurement beam is used for scanning according to this exemplary embodiment, whereby the profile of the surface 2 of the workpiece 1 can be measured.

In this exemplary embodiment, the reference mirror 23 is fixed on the fixed member 11 and the relative position of the reference mirror 23 and the workpiece 1 is also fixed. Accordingly, even when there is caused the motion error $\Delta E$ in accordance with the movement of the scanning member 12, the motion error $\Delta E$ equally works on the measurement optical path Pm to the workpiece 1 and the reference optical path Pr to the reference mirror 23. Thus, the influence of the motion error $\Delta E$ on the interference between the reference beam and the measurement beam is cancelled, whereby the influence of the motion error $\Delta E$ in accordance with the scanning process can be eliminated.

Further, in this exemplary embodiment, since the optical path length Lm of the measurement optical path Pm (from the polarizing beamsplitter 221 to the predetermined portion 143 on the cantilever 142) is set equal to the optical path length Lr (=Lr1+Lr2) of the reference optical path Pr (from the polarizing beamsplitter 221 to the reference mirror 23), the dead path (i.e. difference in the optical path lengths of the respective optical paths) is not created. Thus, the influence of an error due to the presence of the dead path can be eliminated.

For instance, though the laser source 21 in this exemplary embodiment is provided by a gas laser source or a semiconductor laser source that provides laser beam with relatively low stability, since the error due to the presence of the dead path is not caused even with the use of such a laser source, a highly accurate measurement is possible and the production cost of the profile measuring instrument can be reduced.

In addition, since the measurement optical path Pm and the reference optical path Pr are separately provided and the reference mirror 23 can be disposed at a position remote from the workpiece 1, it is not necessary to provide a structure for covering the workpiece 1, so that the measurable area of the workpiece 1 is not limited.

In this exemplary embodiment, the reference surface of the reference mirror 23 (i.e. a reflection surface facing the reference optical path Pr) is aligned in parallel with the Y-axis direction (scan direction). Thus, even when the polarizing beamsplitter 221 and the reference optical path Pr are horizontally moved together with the scanning member 12 during the scanning operation, since the reflection surface of the reference mirror 23 extends in parallel to the scan direction, the optical path length Lr of the reference optical path Pr from the polarizing beamsplitter 221 to the reference mirror 23 does not change but the optical path length of the reference optical path Pr always stays constant.

In addition, all of the components of the profile measuring instrument 10 including the scanning member 12 and the laser interferometer 20 are integrally provided on the fixed member 11 and the fixed member 11 is supported by the column 7, so that the positions of the components are fixed relative to the workpiece 1. Accordingly, by detaching the fixed member 11 from the column 7 and by attaching the fixed member 11 to a different part of the column 7 or moving the fixed member 11 relative to the column 7, similar profile measurement can be performed on the workpiece 1 fixed on the base 9. Thus, a surface 2 of an entirety of a huge workpiece 1 can be measured by disposing the column 7 along the workpiece 1 and repeating the profile measurement while sequentially shifting the position of the profile measuring instrument 10.

Incidentally, it should be understood that the scope of the present invention is not limited to the above-described exemplary embodiment but includes modifications and improvements as long as the modifications and improvements are compatible with the invention.

In the above-described exemplary embodiment shown in FIG. 1, the contact mechanism 14 including the cantilever 142 and the stylus 141 is used and the measurement optical path Pm reflected at the predetermined portion 143 is set, so that it is not necessary to directly reflect the measurement beam by the surface 2 of the workpiece 1 and the reliable measurement beam without being influenced by reflection properties of the surface 2 of the workpiece 1 can be obtained.

In contrast, the measurement beam may alternatively be reflected by the surface 2 of the workpiece 1 without using the contact mechanism 14.

Figure 3:
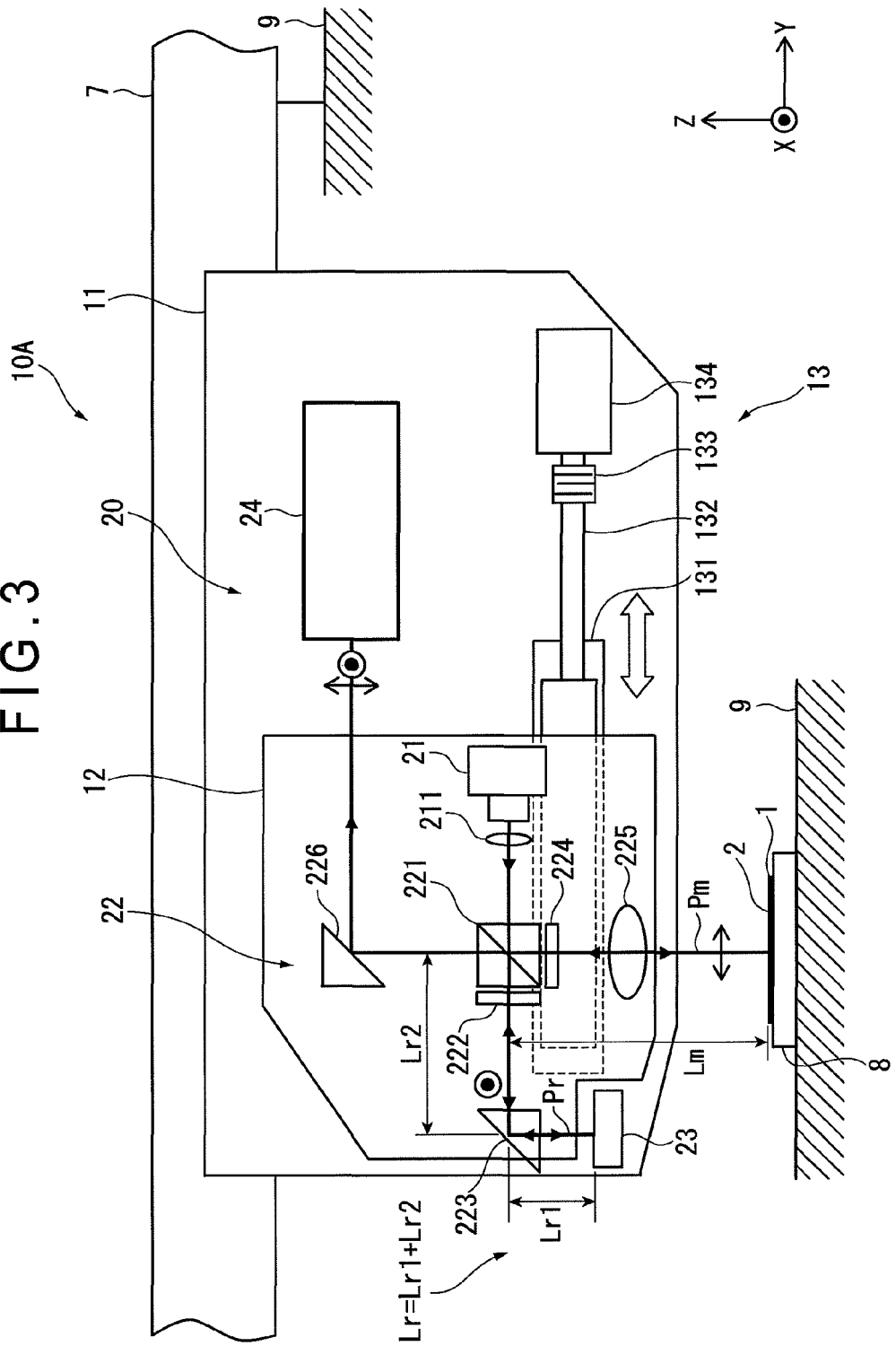
FIG. 3 schematically shows another exemplary embodiment of the invention.

As shown in FIG. 3, a profile measuring instrument 10A according to another exemplary embodiment of the invention is different from that of the exemplary embodiment shown in FIG. 1 in that the contact mechanism 14 is not provided. However, the other components in the exemplary embodiment shown in FIG. 3 are the same as those in FIG. 1, where the same components are denoted by the same reference numerals to avoid repeated explanation.

According to this exemplary embodiment, the measurement beam from the polarizing beamsplitter 221 is reflected at a predetermined point on the surface 2 of the workpiece 1 to be returned to the polarizing beamsplitter 221. Thus, the optical path from the polarizing beamsplitter 221 to the predetermined point on the surface 2 of the workpiece 1 is defined as in the measurement optical path Pm. In this exemplary embodiment, the optical path length Lm of the measurement optical path Pm is set approximately equal to the optical path length Lr (=Lr1+Lr2) of the reference optical path Pr by an adjustment process similar to that in the exemplary embodiment shown in FIG. 1.

According to this exemplary embodiment, substantially the same advantages as the exemplary embodiment shown in FIG. 1 can be obtained except for the advantages due to the presence of the cantilever 142 and the stylus 141.

Though the laser interferometer 20 is used as an interferometer and the laser source 21 is used as a light source in the above exemplary embodiment, an interferometer using a low-coherence light source such as a high-intensity light-emitting diode that emits less coherent beam than laser beam may alternatively be used.

Even with the use of an interferometer using such a low-coherence light source, the interference can be sufficiently measured by substantially eliminating the dead path (i.e. substantially equalizing the optical path lengths of the measurement optical path Pm and the reference optical path Pr) according to the invention, so that a workpiece can be measured taking advantages of low noise properties that characterizes a high-intensity light-emitting diode as a low-coherence light source. Specifically, the high-intensity light-emitting diode can reduce interference noises due to interference of unnecessary lights generated by multiple reflections in the optical elements and the like, so that a highly accurate measurement can be performed under a condition with small interference noise that leads to a measurement error.

What is claimed is:

1. A profile measuring instrument, comprising:
   a fixed member of which position is fixed relative to a workpiece having a surface of which profile to be measured;
   a scanning member supported by the fixed member, the scanning member being movable in a scan direction along the surface of the workpiece relative to the fixed member; and
   an interferometer provided to the fixed member, the interferometer detecting a displacement of the surface of the workpiece along the scan direction, wherein
   the interferometer comprises:
   a light source;
   a beam splitter provided to the scanning member, the beam splitter dividing a beam from the light source into a reference beam and a measurement beam;
   a reference mirror fixed to the fixed member;
   a measurement optical path in a form of an optical path of the measurement beam, the measurement optical path extending from the beam splitter to the workpiece; and
   a reference optical path in a form of an optical path of the reference beam, the reference optical path extending from the beam splitter to the reference mirror, and wherein
   an optical path length of the measurement optical path and an optical path length of the reference optical path are substantially equal such that a difference between the optical path length of the measurement optical path and the optical path length of the reference optical path becomes a predetermined tolerable error or less, wherein the predetermined tolerable error is defined as a value equal to a measurement accuracy required for the measurement instrument divided by frequency stability of the light source.

2. The profile measuring instrument according to claim 1, wherein the reference mirror has a reflection surface facing the reference optical path, the reflection surface being arranged in parallel to the scan direction.

3. The profile measuring instrument according to claim 1, further comprising:
   a cantilever having a fixed end supported by the scanning member; and
   a stylus provided at a free end of the cantilever, the stylus having a tip that is adapted to be in contact with the surface of the workpiece, wherein the measurement beam from the beam splitter is reflected by a predetermined portion on the cantilever on a side opposite to the stylus.

4. The profile measuring instrument according to claim 1, wherein the interferometer is a laser interferometer that uses a gas laser source or a semiconductor laser source as the light source.

5. The profile measuring instrument according to claim 1, wherein the interferometer uses a low-coherence light source that emits a beam of which coherence is lower than a laser beam.

* * * * *